UNITED STATES PATENT OFFICE.

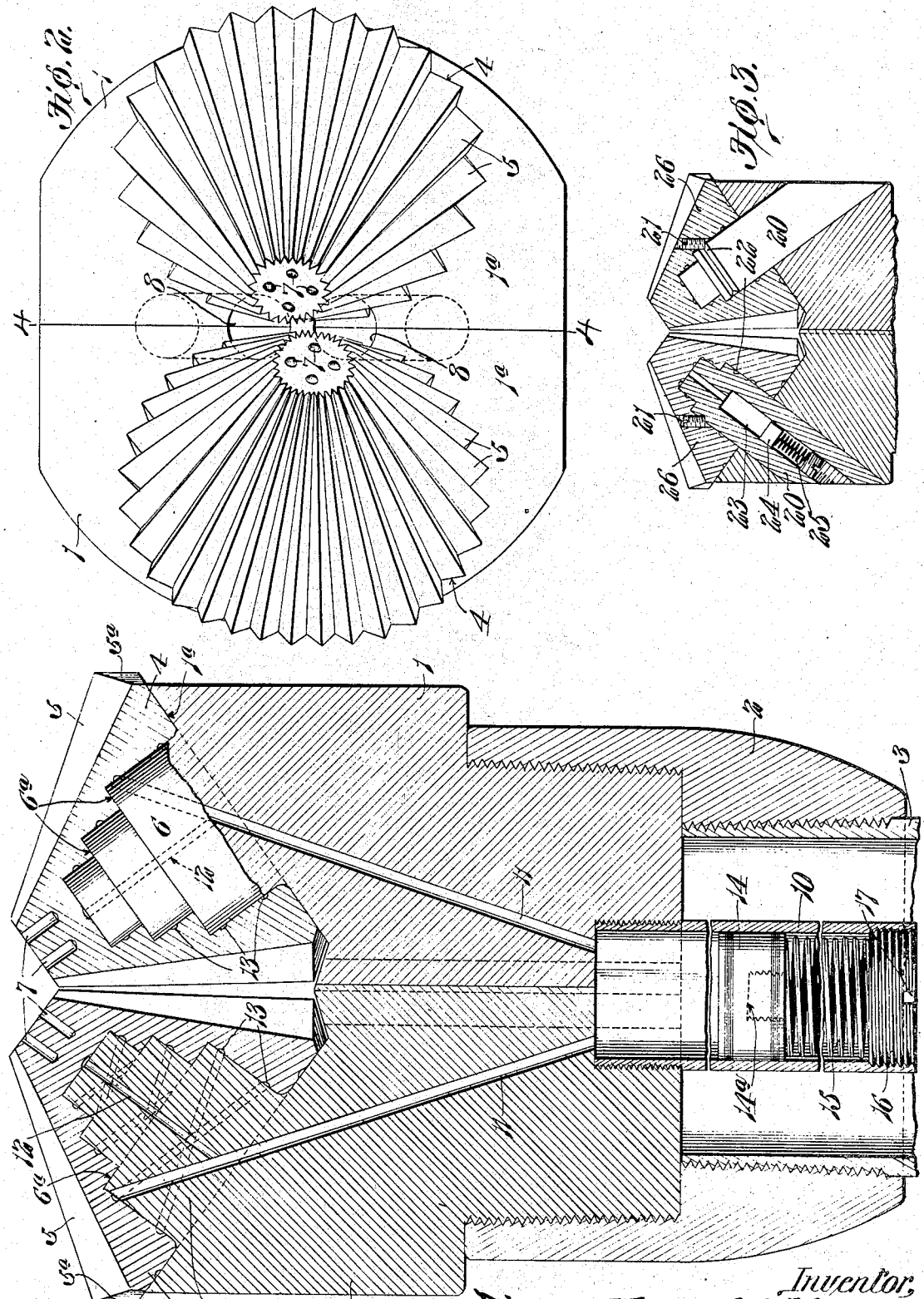

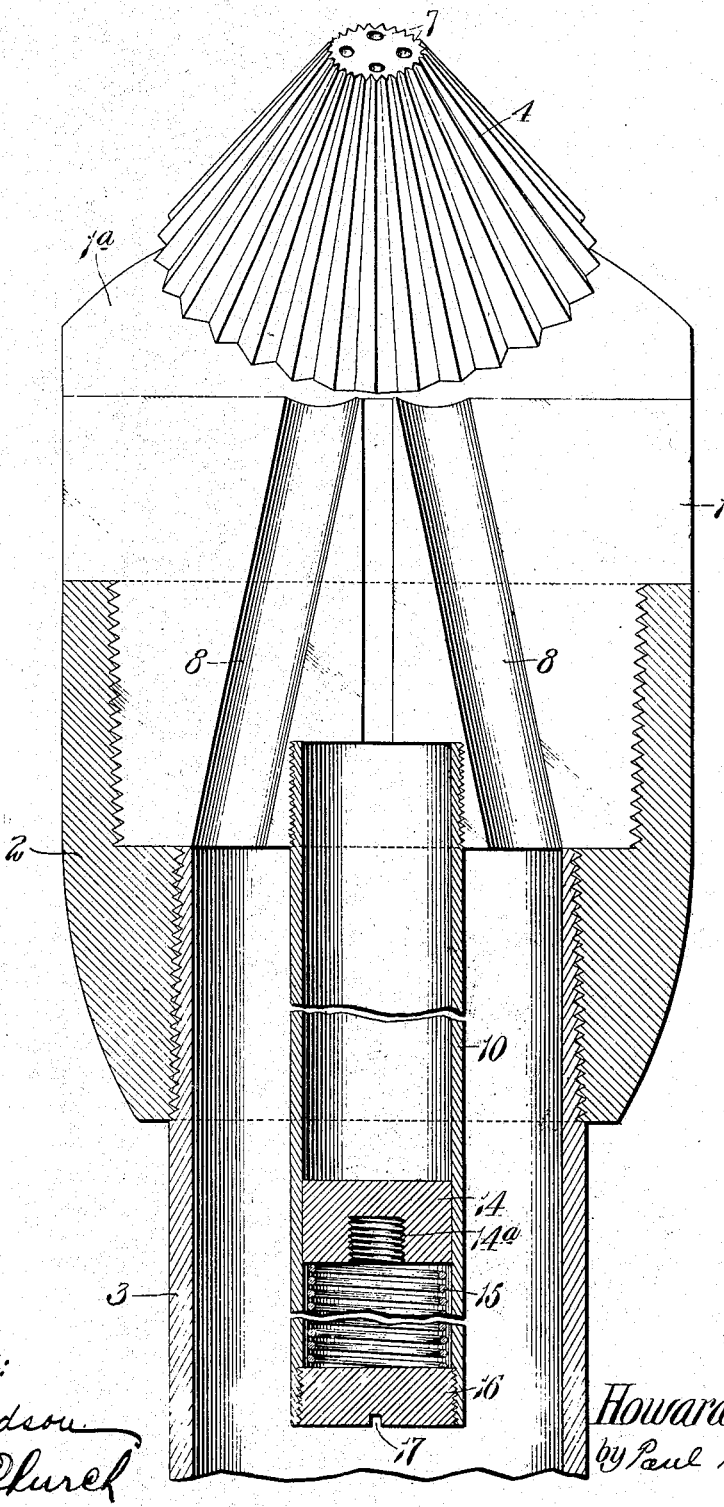

HOWARD R. HUGHES, OF HOUSTON, TEXAS.

DRILL.

No. 930,759.     Specification of Letters Patent.     Patented Aug. 10, 1909.

Application filed November 20, 1908. Serial No. 463,643.

*To all whom it may concern:*

Be it known that I, HOWARD R. HUGHES, a citizen of the United States, residing at Houston, Texas, have invented a certain new and useful Improvement in Drills, of which the following is a full, clear, and exact description, such as will enable others skilled in the art to which it appertains to make and use the same, reference being had to the accompanying drawings, forming part of this specification, in which—

Figure 1 is a vertical sectional view of a drill constructed in accordance with my invention; Fig. 2 is an end view of the drill; Fig. 3 is a detail vertical sectional view illustrating a modified form of my invention; and Fig. 4 is a vertical sectional view taken on the line 4—4 of Fig. 2.

This invention relates to boring drills, and particularly to roller drills such as are used for boring holes in earth, rock, concrete and other hard substances.

One object of my invention is to provide a drill of the type referred to which is compact and strong and composed of only a few large parts, thus enabling the drill to be built so that it will drill comparatively small holes, such, for example, as four inch holes.

Another object is to provide a roller drill having means for keeping the rollers or cutting members thoroughly lubricated.

Other objects and desirable features of my invention will be hereinafter pointed out.

Referring to the drawings which illustrate the preferred form of my invention, 1 designates two members that coöperate with each other to form the head of the drill, said members being connected together by any suitable means, such, for example, as an internally screw-threaded sleeve 2 that surrounds a reduced screw-threaded portion on said members. The sleeve 2 is provided with a screw-threaded bore for receiving the screw-threaded end of a tubular-shaped operating member 3 that imparts rotary movement to the head, and the inner vertically disposed faces of the members 1 are provided with some suitable means for preventing said members from moving laterally relatively to each other. In the construction herein shown one of the members 1 is provided with one or more tongues that project into grooves in the other member 1 but it will, of course, be obvious that the contacting faces of the members 1 could be provided with any other suitable means for accomplishing the same result without departing from the spirit of my invention.

The drill herein shown is provided with two cutting members 4 which preferably consist of frusto-conical-shaped rollers having longitudinally extending chisel teeth 5 that disintegrate or pulverize the material with which they come in contact and thus form a round hole in said material when the head of the drill revolves. These cutting members 4 are arranged at an angle to each other, as shown in Fig. 1, and are rotatably mounted on stationary spindles 6, each of which is preferably formed integral with one of the members 1 that form the head of the drill. The end faces 1$^a$ of the members 1 are flat and are disposed at an angle to each other, as shown in Fig. 1, so that the end face of the head will be approximately V-shaped and each of the spindles 6 is disposed at approximately a right angle to the end face 1$^a$ of the member 1 to which it is connected. The bases or inner end faces of the cutting rollers 4 bear upon the angularly disposed end faces 1$^a$ of the head so that a substantial bearing will be provided for each roller to take up the end thrust to which the roller is subjected when it is operating upon the material in which the hole is being formed. I also prefer to provide the rollers with faces that bear upon the ends of the spindles when the drill is operating so as to help take up the end thrusts. The cutting rollers 4 are arranged opposite to each other, as shown in Fig. 2, so that the weight of the drill will be distributed equally on said rollers and, as the spindles of said rollers project toward each other or tread the longitudinal center of the head, as shown in Fig. 1, it will be impossible for either roller to drop off its spindle after the members 1 have been connected together for the rollers fill the space between said spindles. By mounting the rollers in this manner I overcome the necessity of using fastening devices to retain the rollers in operative position and thus reduce the number of parts of the drill.

Instead of using a spindle of uniform diameter throughout its entire length, I prefer to form the spindles 6 in the manner shown in Fig. 1 wherein it will be seen that each spindle has a comparatively large base portion and an end portion of less diameter. The spindles are not reduced gradually from their bases to their outer ends but are provided with a plurality of independent portions of different diameters so as to form a number of shoulders 6ª that resist the end thrust of the cutting rollers, it being understood, of course, that the internal bore of each roller conforms to the shape of the spindle on which it is mounted. By forming the spindles in this manner, I not only obtain a large end thrust resisting bearing surface for each roller but I also obtain a very strong and rigid spindle which has a large cross sectional area of metal so that the spindle will not break when the rollers are subjected to excessive strains.

In the preferred form of my invention the spindles 6 are so disposed that the axis of each cutting roller extends tangentially, or slightly to one side of the longitudinal axis of the head, as shown in Fig. 2, so that the chisel teeth on the rollers will have a shearing action on the material. This same result, however, could be accomplished in other ways so that I do not wish it to be understood that my broad idea is limited to this exact construction nor to a construction in which the rollers have a shearing action on the material for, if desired, they could be so arranged that they have a true rolling action on the material. The outer end faces of the rollers are provided with a number of recesses or grooves 7 whose edges shear or grind down the material and the outer ends of the chisel teeth 5 on the rollers are preferably so shaped that they form cutting edges 5ª that shear off the material from the sides of the hole being formed. The rollers 4 are so disposed that they form a hole of greater diameter than the head of the drill so as to provide a clearance or passageway for the pulverized or disintegrated material that is forced out of the hole by means of water that is forced down into the hole through the tubular-shaped operating member 3 to which the roller-carrying head is connected, said head being provided with a number of longitudinally extending bores 8, as shown in Fig. 2, that communicate with the internal bore of the sleeve 2 so as to provide a passageway for the water. I prefer to have these bores 8 inclined inwardly toward the longitudinal center of the head, as shown in full lines in Fig. 4 and in dotted lines in Fig. 2, so that the water will be introduced between the two cutting rollers 4 but it will, of course, be obvious that the bores 8 could be shaped to introduce the water at any desired point without departing from the spirit of my invention.

One very desirable feature of the drill herein shown is that the cutting rollers 4 are kept thoroughly lubricated. As shown in Fig. 1, the head of the drill is provided with a tubular-shaped member 10 that forms a cup or chamber for a mass of compressed lubricant, one end of said chamber communicating with ducts 11 that lead to the outer surfaces of the spindles 6, and said ducts being provided with branches 12 that lead to the end faces of the spindles. Grooves 13 are formed in the internal bore of each roller so that the lubricant in the cup 10 will be distributed to the entire surface of the spindle that projects into said bore, thus keeping the rollers thoroughly lubricated. The grooves 13 preferably extend spirally around the internal bores of the rollers and also on the inner end faces of the rollers so as to distribute the lubricant to the surface on which the inner ends of the rollers bear, the lubricant escaping from the grooves on the inner end faces of the rollers. The compressed lubricant which is placed in the cup 10 is forced through the ducts and grooves above referred to when the lubricant becomes heated, by means of a plunger 14 mounted in the member 10, as shown in Fig. 1, and acted upon by some suitable propelling force such as a coiled expansion spring 15, said spring being retained in position by means of a plug 16 which is screwed into the tubular-shaped member 10. The plug 16 is preferably provided with a slot 17 for receiving a screw-driver so that it can be screwed into and out of the member 10, and if desired, the end face of the plunger can be provided with a screw-threaded socket 14ª, as shown in dotted lines in Fig. 1, that is adapted to receive a screw-threaded rod or tool so as to enable the plunger to be drawn out of the member 10 when said member is to be refilled with lubricant. By constructing a drill in this manner I am able to keep the bearing surfaces of the rollers thoroughly lubricated for the pressure exerted on the plunger 14 is sufficient to force the lubricant through the ducts 11 and grooves 13 continually. The tubular-shaped member 10 can be made long enough to hold a large quantity of lubricant as said member projects upwardly into the hollow operating member 3 to which the head of the drill is connected, thus providing a structure that will contain enough lubricant to enable the drill to continue in operation for an extended period.

While I have herein stated that the lubricant is distributed to the surfaces on which the rollers bear by means of a spring-pressed plunger. I do not wish it to be understood that my broad idea is limited to such a structure for, if desired, any other suitable propelling medium than a spring could be employed, or the plug 16 and spring 15 could be removed and thus permit the pressure of the water which is forced through the operating member 3 to act directly on the plunger 14 and force the lubricant through the ducts and grooves. When the drill is used in this manner I can vary the quantity of lubricant that is supplied to the rollers by regulating the pressure of the water that is forced through the operating member 3.

It is preferable to have a plunger 14 interposed between the lubricant and the water that is forced down through the hollow member 3 but it is not absolutely necessary to use a plunger for the lubricant is so thick that the water will not penetrate through same.

Instead of forming the roller spindles integral with the members 1, as shown in Fig. 1, each of said spindles could consist of a separate piece 20 securely connected in some suitable manner to the member 1, as shown in Fig. 3. Each of the cutting rollers could also be provided with one or more removable pins 21 that project into a groove 22 in the spindle 20, as shown in Fig. 3, to prevent displacement of the roller, but such pins are not necessary as the rollers cannot drop off their spindles as previously stated.

In the form illustrated in Fig. 3, the cup for receiving the lubricant consists of a bore 23 that is formed in the spindle 20 and a plunger 24 and spring 25 are arranged in said bore for forcing the lubricant into the grooves 26 in the cutting rollers.

A drill of the construction above described comprises only a few parts and as these parts are all large and strong, the drill can be used for drilling small holes, such, for example, as four inch holes. That is to say, by forming the drill so that it is composed of only a few parts, each of said parts can be made large enough to withstand the strains to which it is subjected even when the drill is designed to produce a four inch hole. When the drill is used for boring large holes the parts of course will be made larger and therefore produce a very strong and rigid structure, but the point I wish to emphasize is that a drill of the construction above described can be used for drilling small holes as the drill comprises such a few parts that all of said parts can be made large and strong enough to prevent them from breaking when the rollers come into contact with a piece of very hard substance during the drilling operation.

In the preferred form of my invention, as shown in Fig. 1, the drill comprises practically only five parts; namely, the two cutting rollers 4, the two members 1 which constitute the head of the drill, and the sleeve 2 which locks the members 1 together. The spindles for the rollers are formed integral with said members 1 and said spindles and rollers are so arranged that no fastening devices are required to retain the rollers in operative position. Furthermore, the spindles for the rollers are not exposed so that a hard piece of material cannot become wedged between the supporting means for the rollers and a rigid obstruction and thus cause the rollers to break off, and as the spindles are completely incased by the rollers, dirt cannot collect on the spindles and thus cause them to wear quickly.

It will, of course, be understood that it is immaterial whether the distributing grooves are formed on the spindles and head or on the rollers, and it is also immaterial whether said grooves are straight or spiral. I prefer to arrange them spirally, however, as herein shown, so that they will form practically a centrifugal pump and thus cause the lubricating medium to flow continually over the surfaces which are to be lubricated. The rotary movement of the head, of course, tends to throw the lubricating medium on the end face of the head outwardly and thus cause it to escape but the pressure of the water in the tubular-shaped operating member constitutes the principal means for forcing the lubricating medium over the contacting surfaces of the head and rollers. This means for automatically lubricating the bearings of the rollers in a drill of this type and forcing the lubricating medium through the distributing grooves and ducts continually, contributes greatly to the efficiency of the drill, for if said lubricating medium were not forced continually over the surfaces of the head against which the rollers bear the friction and weight of the head on the rollers would soon cause the lubricant to lose its cohesiveness. That is to say, if the lubricating medium was not forced continually over the contacting surfaces of the head and rollers the excessive weight or downward pressure that the head exerted on the lubricant would soon separate the molecules thereof and thus cause the lubricant to lose its viscosity. By constructing the drill in the manner above described I prevent this from occurring and I also prevent the lubricant from gumming.

While I have herein stated that the cutting rollers are provided with longitudinally extending chisel teeth I wish it to be understood that it is immaterial, so far as my broad idea is concerned, what kind of cutting surfaces the rollers are provided with.

Having thus described my invention, what I claim as new and desire to secure by Letters Patent is:

1. A drill provided with a head having an end face which comprises a plurality of angularly disposed surfaces, spindles projecting from said angularly disposed surfaces toward the longitudinal center of the head, and approximately conical-shaped cutting rollers mounted on said spindles and having their inner ends or bases bearing against the angularly disposed surfaces on the end face of the head; substantially as described.

2. A drill consisting of a head having an approximately V-shaped end face, inclined spindles projecting toward each other from the sides of said end face, and a pair of approximately frusto-conical-shaped cutting rollers loosely mounted on said spindles and coöperating with each other to form a round hole of greater diameter than the head when the head is rotated; substantially as described.

3. A drill provided with a head or supporting member, a pair of angularly-disposed spindles on said head that project toward each other, and approximately frusto-conical-shaped cutting rollers loosely mounted on said spindles and coöperating with each other to retain themselves in operative position on the spindles; substantially as described.

4. A drill provided with a head, spindles on said head that have only their inner ends connected to the head, and cutting rollers of approximately frusto-conical-shape loosely mounted on said spindles, said spindles projecting toward the longitudinal center of the head in proximity to each other so that the cutting rollers cannot drop off the spindles; substantially as described.

5. A drill consisting of a head having an end face in which an approximately V-shaped socket is formed, a spindle projecting toward the longitudinal center of the head from each angularly disposed face of said socket and disposed at approximately right angles thereto, and an approximately frusto-conical-shaped cutting roller mounted on each of said spindles and bearing against the end face thereof; substantially as described.

6. A drill consisting of a head, spindles on said head which diminish in diameter from their bases to their outer ends so as to form a plurality of shoulders, and approximately frusto-conical-shaped cutting members mounted on said spindles and having shoulders that bear against the coöperating shoulders on the spindles when the drill is in service; substantially as described.

7. A drill provided with approximately frusto-conical-shaped cutting rollers, and spindles for said rollers which have only their inner ends connected to the head, said spindles having shoulders which assist the end faces of the spindles in taking up the end thrusts to which the rollers are subjected; substantially as described.

8. A drill consisting of a head provided with integral spindles that project from the head, and cutting rollers rotatably mounted on said spindles and bearing against the ends of said spindles; substantially as described.

9. A drill comprising a head composed of a plurality of parts, a spindle projecting from each of said parts toward the longitudinal center of the head, a cutting roller of approximately frusto-conical-shape mounted on each of said spindles and covering the outer end thereof, and means for securing the parts of the head together; substantially as described.

10. A drill consisting of a head having an end face which comprises a number of angularly disposed flat surfaces, spindles projecting from said angularly disposed surfaces toward the longitudinal center of the head, and cutting rollers mounted on said spindles and bearing against the angularly disposed surfaces of the head and against the outer ends of the spindles; substantially as described.

11. A drill comprising a head which consists of a pair of members having inclined end faces that coöperate with each other to produce an approximately V-shaped pocket in the end face of the head, a spindle formed integral with each of said members and projecting from the inclined end face thereof toward the longitudinal center of the head, an approximately frusto-conical-shaped cutting member rotatably mounted on each of said spindles one of said cutting members preventing the other from moving longitudinally of its spindle, and means for clamping said members together; substantially as described.

12. A drill comprising a head consisting of a plurality of parts each of which is provided with an angularly-disposed end face, a sleeve surrounding said parts for clamping them together, a spindle projecting from the end face of each of said parts toward the longitudinal center of the head, and an approximately frusto-conical-shaped cutting roller mounted on each of said spindles and bearing against the angularly disposed end face of the part to which the spindle is connected, said rollers covering the ends of their spindles; substantially as described.

13. A drill consisting of a head provided on its end face with spindles that project inwardly toward the longitudinal center of the head, the outer ends of said spindles having no connection with the head, and frusto-conical-shaped cutting rollers mounted on said spindles and bearing against the ends thereof, the inner ends of said rollers bearing directly upon the end face of said head; substantially as described.

14. A drill comprising a head which consists of a pair of members, a sleeve surrounding portions of said members, means independent of the sleeve for preventing said members from moving laterally relatively to each other, said members being provided with end faces that coöperate with each other to form a substantially V-shaped pocket, a spindle projecting from the end face of each member toward the longitudinal center of the head, and an approximately frusto-conical-shaped cutting roller rotatably mounted on each of said spindles; substantially as described.

15. A drill consisting of a head, and frusto-conical-shaped cutting rollers mounted on spindles on the end face of said head and provided with longitudinally extending chisel teeth, said rollers also having cutting edges that shear off the material from the sides of the hole which the rollers form in the material on which the drill is operating; substantially as described.

16. A drill having approximately frusto-conical-shaped cutting rollers that are provided in their outer end faces with holes that form cutting edges, said rollers also having cutting edges that shear off the material from the side of the hole which the drill forms in the material on which it operates; substantially as described.

17. A boring tool comprising a head provided with cutting rollers, a hollow operating member connected to said head for forcing it downwardly into the material in which the hole is being formed, said member being utilized as a conduit for introducing water into the hole so as to flush out the disintegrated material, means arranged adjacent the head for holding a mass of lubricant, and means adapted to be acted upon by the water that is forced through said operating member for supplying the lubricant to the bearings of the cutting rollers; substantially as described.

18. A boring tool provided with cutting rollers, means for holding a lubricating medium, and means for introducing water into the hole being formed to flush out the disintegrated material and also supply said lubricating medium to the surface of the head on which the cutting rollers bear; substantially as described.

19. A boring tool consisting of a head provided with cutting rollers, a lubricant holder, ducts leading from said holder to the bearings of said rollers, and a hollow operating member connected to said head for introducing water into the hole being formed so as to flush out said hole and also exert pressure on the lubricant in said holder; substantially as described.

20. A boring drill comprising a head provided with cutting rollers, a tubular-shaped operating member connected to said head for turning it and also for introducing water into the hole being formed, the head being provided with openings that permit the water to escape from said operating member, a lubricant holder arranged inside of said operating member so that the force of the water in said member will be exerted on the lubricant, and ducts leading from said lubricant holder for conducting the lubricant to the surfaces of the head with which the cutting rollers contact; substantially as described.

21. A drill comprising a head that is connected to a tubular-shaped operating member through which water is introduced to flush out the hole that the drill forms in the material, cutting rollers carried by said head, a hollow lubricant holder carried by said head and projecting up into said operating member, and means for conducting the lubricant in said holder to the surfaces of the head on which the cutting rollers bear, the pressure of the water that is forced through said hollow operating member being exerted on the lubricant and thus supplying it automatically to said bearing surfaces; substantially as described.

22. A drill comprising a head that is adapted to be connected to a tubular-shaped operating member through which water is introduced to flush out the hole that the drill forms in the material, cutting rollers carried by said head, a hollow member carried by said head and projecting up into said operating member to contain a lubricant, and ducts leading from said hollow member to the bearing of said rollers, the pressure of the water that is forced through the tubular-shaped operating member causing the lubricant to be forced through said ducts; substantially as described.

23. A drill comprising a head that is adapted to be connected to a tubular-shaped operating member through which water is introduced to flush out the hole that the drill forms in the material, cutting rollers carried by said head, a hollow member carried by said head and projecting up into said operating member to contain a lubricant, ducts leading from said hollow member to the bearings of said rollers, and a plunger for forcing the lubricant through said ducts, said plunger being subjected to the pressure of the water that passes through the operating member and thus causing the lubricant to be automatically supplied to the rollers; substantially as described.

24. A drill comprising a head that is adapted to be connected to a tubular-shaped operating member through which water is introduced to flush out the hole that the drill forms in the material, cutting rollers carried by said head, a hollow member carried by said head and projecting up into said operating member to contain a lubricant, ducts leading from said hollow member to the bearings of said rollers, a plunger for forcing the lubricant through said ducts, a spring-operating on said plunger, and a removable device connected to the hollow member which contains the lubricant for retaining said spring in position; substantially as described.

25. A drill consisting of a head provided with a cup for containing a lubricant, spindles carried by said head, cutting rollers mounted on said spindles and provided on their internal bores with grooves that extend longitudinally of the spindles, ducts for conducting the lubricant in said cup to said grooves, and a hollow operating member connected to said head for introducing water into the hole which the drill forms; substantially as described.

26. A drill consisting of a head provided on its end face with spindles that project toward the longitudinal center of the head, cutting rollers rotatably mounted on said spindles and having approximately spiral grooves formed in the surfaces thereof that bear upon said spindles, a cup on said head for containing a lubricant, ducts leading from said cup to the grooves in said rollers, and a tubular-shaped operating member connected to said head for introducing water into the hole which the drill forms to flush out said hole and also exert pressure on the lubricant; substantially as described.

27. A drill consisting of a head provided with cutting rollers, a cup in said head for receiving a mass of compressed lubricant, means for permitting the lubricant in said cup to flow to the bearings of said rollers, a plunger in said cup that forces the lubricant out of same when it becomes heated, a screw-threaded socket in said plunger for receiving a tool so as to enable said plunger to be drawn out of the cup, and a tubular-shaped operating member connected to said head for introducing water into the hole which the drill forms so as to flush out said hole and also exert pressure on the plunger that acts on the lubricant; substantially as described.

28. A boring drill provided with an approximately frusto-conical-shaped cutting roller having teeth that shear off the material from the side of the hole which the drill forms; substantially as described.

29. A drill consisting of a head having an end face which comprises a plurality of roller-bearing surfaces that converge toward the longitudinal center of the head, and a plurality of approximately frusto-conical-shaped cutting rollers arranged with their inner ends or bases bearing against the bearing surfaces on the end face of the head, some of said rollers having teeth that operate on the side of the hole being formed; substantially as described.

In testimony whereof I hereunto affix my signature in the presence of two witnesses, this seventeenth day of November 1908.

HOWARD R. HUGHES.

Witnesses:
WELLS L. CHURCH,
GEORGE BAKEWELL.